United States Patent [19]

Unterstrasser

[11] 4,305,596
[45] Dec. 15, 1981

[54] JOINT SEAL ON THE ROTOR DRIVE OF AN ECCENTRIC SCREW MACHINE

[75] Inventor: Eugen Unterstrasser, Aschau, Fed. Rep. of Germany

[73] Assignee: Netzsch-Mohnopumpen GmbH, Selb, Fed. Rep. of Germany

[21] Appl. No.: 67,407

[22] Filed: Aug. 17, 1979

[30] Foreign Application Priority Data

Aug. 24, 1978 [DE] Fed. Rep. of Germany ....... 2837049

[51] Int. Cl.³ ............................................. F16D 3/76
[52] U.S. Cl. .................................. 277/212 FB; 64/7; 67/9 R
[58] Field of Search ............... 277/212 FB, 212, 81 R; 64/7, 9 R, 9 A

[56] References Cited

U.S. PATENT DOCUMENTS

| | | | |
|---|---|---|---|
| 3,427,825 | 2/1969 | John et al. | 64/7 |
| 3,638,453 | 2/1972 | Ehret | 64/9 |
| 3,901,518 | 8/1975 | Uchida | 277/212 FB |
| 4,220,418 | 9/1980 | Kondo et al. | 277/212 FB |
| 4,229,952 | 10/1980 | Aucktor | 64/7 |

FOREIGN PATENT DOCUMENTS 16941 8/1969 Fed. Rep. of Germany .

*Primary Examiner*—Robert I. Smith
*Attorney, Agent, or Firm*—Paul F. Prestia

[57] ABSTRACT

Improved joint seal for the rotor drive of an eccentric screw machine comprises a sealing cuff of elastomeric or thermoplastic material with a radially exterior rim bead connected to the outer joint sleeve by means of an exterior supporting ring, and a radially interior rim bead with a generally axis-parallel ring apron radially outward thereof. An interior supporting ring with an axis-parallel annular limb connects the radially interior rim bead of the cuff to a coupling rod of the joint with the annular limb of the interior supporting ring clasped between the radially interior rim bead and the ring apron disposed outwardly thereof on the sealing cuff. The radially exterior rim bead may be connected to the joint sleeve by means of an exterior supporting ring similar to the interior supporting ring.

10 Claims, 3 Drawing Figures

JOINT SEAL ON THE ROTOR DRIVE OF AN ECCENTRIC SCREW MACHINE

GENERAL BACKGROUND

Eccentric screw machines are pumps or fluid-drive motors with a hollow, screw-like stator in which a screw-shaped rotor turns eccentrically around the axis of the stator while at the same time turning around on its own axis. For this combined rotary movement the rotor is linked by a joint to a coupling rod, which in turn is connected by an additional joint to a drive shaft that is supported in a fixed position. The two joints, while the delivery medium or drive fluid is flowing around them, must permit the coupling rod to move angularly with respect to the axis of the rotor or the drive shaft, in continuously changing directions and in orders of magnitude of generally 2° to 4°. In this process the joints, regardless of their make-up, must be securely sealed off from the delivery medium or the drive fluid, if, as is usually the case, the fluid is not suitable for joint lubrication or actually contains corrosive and/or abrasive components.

FIELD OF THE INVENTION

The invention relates to a joint seal on the rotor drive of an eccentric screw machine in which a joint sleeve is connected with a coupling rod that can move at an angle with respect to it by means of a sealing cuff made of elastomeric or thermoplastic material, said sealing cuff being clamped to the joint sleeve and to the coupling rod by means of a supporting ring, wherein at least the radially interior supporting ring assigned to the coupling rod has an axially parallel annular limb which grasps the cuff by means of a likewise essentially axially parallel rim bead formed on said cuff.

PRIOR ART

In a known joint seal of this type (German Utility Pat. (DE-GM) No. 69 16 941) the radially interior rim bead of the sealing cuff is directed axially outward and the corresponding supporting ring is located axially outside the sealing cuff on a cylindrical ledge of the coupling rod and is supported against a shoulder limiting said ledge. Thus, said sealing ring is exposed to the delivery medium. Inside the sealing cuff on a cylindrical lug of the coupling rod, whose diameter is smaller than that of the ledge, a clamping ring is fastened. This ring clamps the sealing cuff between itself and the supporting ring in an axial direction. In this known joint seal the stresses to which the sealing cuff is subjected during operation concentrate in a narrowly limited annular zone around the radially interior rim bead. These stresses arise partly because of the relatively intense axial clamping of the radially interior rim bead between the supporting ring and the clamping ring, and partly because of the unavoidable flexing of the sealing cuff which results from the coupling rod moving angularly with respect to the joint sleeve. Also unavoidable are stresses due to the pressure of the delivery medium or drive fluid of the eccentric screw machine. In the case of eccentric screw pumps for granular feed material, there may be additional stresses due to the granules striking the sealing cuff. The collective result of all these stresses in the case of joint seals of the type just described is that the sealing cuff is more rapidly destroyed in the area around its radially interior rim bead. Damage also occurs, although not as frequently, in the annular area of the sealing cuff adjacent to the outer supporting ring.

SUMMARY OF THE INVENTION

An objective of the present invention is to provide an improved joint seal of the general type referred to above in which the accumulation of stresses in the sealing cuff, especially in the area around its radially interior bead rim, are avoided or at least minimized so that the sealing cuff may have a longer use life under normal operating conditions.

In accordance with the present invention, this objective is met in that at least said radially interior bead rim of the sealing cuff (in the installed state), regardless of any axial clamping, is maintained under radial prestress, said bead rim together with a likewise essentially axially parallel annular apron of the sealing cuff, clasping in the manner of forceps, said axially parallel annular limb of said supporting ring.

The radial prestress in the radially interior rim bead can be produced by merely sliding the corresponding supporting ring onto the coupling rod. This radial prestress is responsible for the tight seating of the rim bead on the coupling rod. In addition, the radial bead may be placed under axial stress; however, this stress can and should be kept fairly small. In any case, stress concentrations around the sealing cuff adjacent to the rim bead are avoided because it is not the rim bead alone which connects the sealing cuff with the supporting ring, but an additional connection of the cuff with the supporting ring is formed by the annular apron, in accordance with the invention, which prevents all flexing movements of the annular area of the sealing cuff immediately adjacent to the rim bead.

In order to allow the radial prestress to be created in a simple manner by merely sliding the sealing cuff together with the radially interior supporting ring onto the coupling rod, it is advantageous for the radially interior bead rim, when it is in the relaxed state, to possess a funnel-like bevel on its axially exterior side, said bevel sloping 10° to 20°, preferably 15°, with regard to the axis of the coupling rod.

The radially interior bead rim also adventageously has, on its axially interior side, a funnel-shaped bevel, whose slope is inclined 20° to 40°, preferably 30°, with regard to the axis of the coupling rod. These two bevels create space into which part of the volume of the radially interior rim bead can be displaced when the supporting ring and the sealing cuff are slid onto the coupling rod.

Although the area adjacent to the radially exterior rim bead of the sealing cuff is not as subject to damage as the area adjacent to the radially interior rim bead, it is nevertheless advantageous to have the radially exterior rim bead appropriately formed, clamped, and protected by an annular apron, in the same manner as is the radially interior rim bead.

The invention is also beneficial because both the rim bead and the annular apron surround the axially exterior side of the axis-parallel annular limb of the corresponding supporting ring. In this way, the supporting ring is separated completely from the delivery medium or drive fluid and can therefore be made from an inexpensive, not particularly corrosive-resistant material, even when the delivery medium or drive fluid is highly corrosive.

Finally, it is helpful if the sealing cuff and at least the inner supporting ring are prepared in advance as a ready-to-install construction unit. A connection between the sealing cuff and the supporting ring adequate for this purpose can be achieved when the apron or aprons interlock with a recess in the corresponding supporting ring. Alternatively or in addition, the bead rings and aprons can be vulcanized or glued onto the corresponding supporting ring.

BRIEF DESCRIPTION OF THE DRAWINGS

Specific embodiments of the invention will be discussed in greater detail with the aid of schematic drawings. In the drawings.

DESCRIPTION OF THE PREFERRED EMBODIMENT

Figure 1:
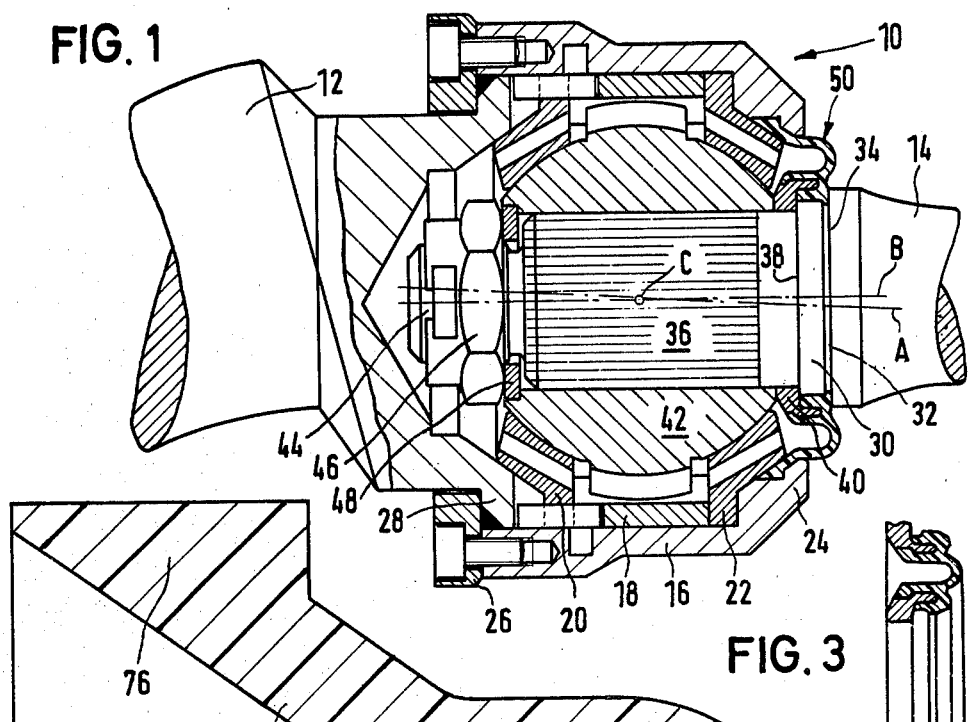
FIG. 1 is an axial section through a joint between a rotor and a coupling rod of an eccentric screw pump with a joint seal in accordance with the present invention.

Joint 10 shown in FIG. 1 is designed to connect a screw-type rotor 12 with a coupling rod 14, in such a manner that the rotor can be turned by the coupling rod around axis A of the rotor while simultaneously carrying out circular movements around parallel axis, wherein angular movments around the center point C of joint 10 occur between the rotor and the coupling rod, center point C being the point of intersection of said axis A of the rotor 12 and the axis B of the coupling rod 14.

Joint 10 includes a joint sleeve 16 surrounding an internally toothed external joint member 18 and a rotor-side radially exterior supporting ring 20 and a coupling rod-side radially exterior supporting ring 22. The space with the joint sleeve 16 is limited in the axial direction on one hand by collar 24 of joint sleeve 16 and on the other hand by a screwed-on clamping ring 26 which overlies flange 28 of rotor 12.

At its joint mating end, coupling rod 14 has a radial shoulder 34, abutting an outwardly facing edge of a sealing cuff 50, and a cylindrical projection 30 which lies approximately radially inside the collar 24 of the joint sleeve 16. An annular groove 32 separates projection 30 from shoulder 34 and the main portion of coupling rod 14 that projects out of joint 10. Additionally, within joint 10 and extending inwardly from projection 30, coupling rod 14 has a cylindrical lug 36 which has a smaller diameter than projection 30 and is set off from it by means of a radial shoulder 38. Adjacent to shoulder 38, lug 36 has a smooth portion. A radially interior supporting ring 40 is slid onto said smooth portion.

Next to the supporting ring 40 an externally toothed inner joint member 42 is provided being slid onto a splined portion of the lug 36 and thus connected to the coupling rod 14 for common rotation. Lug 36 has a threaded extension 44 with a nut 46 screwed thereon and a washer 48 is arranged between the nut 46 and inner joint member 42 thus keeping interior supporting ring 40 clamped between radial shoulder 38 and inner joint member 42.

The interior space of the joint 10, with the construction parts as described, is sealed off by a sealing cuff 50 which bridges an annular gap between collar 24 of joint sleeve 16 and projection 30 of coupling rod 14, said gap changing constantly during operation. Sealing cuff 50 has a radially internal bead rim 52 which is taken up with a radial pre-tension between the cylindrical projection 30 and an axis-parallel annular limb 54 of radially interior supporting ring 40, said limb 54 surrounding projection 30 at a certain radial distance.

Figure 2:
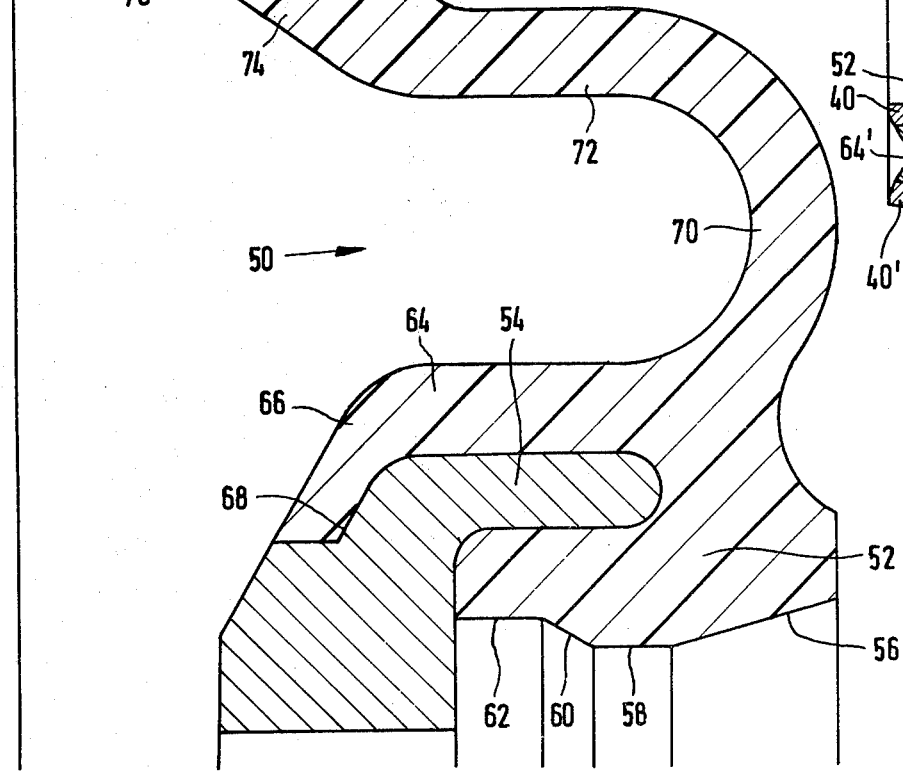
FIG. 2 is a greatly enlarged detail view showing certain components in the assembly of FIG. 1, prior to assembly of the joint.

In the relaxed state prior to sliding onto the cylindrical projection 30, radially interior bead rim 52 has the form shown in FIG. 2, i.e., an interior mantle surface which has a funnel-shaped axially exterior bevel 56, a cylindrical middle section 58, an axially interior funnel-shaped bevel 60 and another cylindrical section 62. The diameter of the cylindrical section 58 is appreciably smaller, while that of the cylindrical section 62 is somewhat larger than the diameter of cylindrical projection 30 of coupling rod 14. Axially exterior bevel 56 defines an angle of about 15° with the axis B of coupling rod 14 while axially interior bevel 60 defines an angle of about 30° with axis B.

Sealing cuff 50 has an annular apron 64 which is disposed radially outward of rim bead 52 and equiaxial with bead 52 on sealing cuff 50. Said apron 64 extends essentially parallel to the axis B into the interior of joint 10 and lies against the external surface of axis-parallel limb 54 of supporting ring 40. Apron 64 further includes edge 66 tapering inwardly like the frustum of a cone so that it meshes with a recess 68 in supporting ring 40.

Radially outward from annular apron 64, sealing cuff 50 includes a toroidal region 70 followed by an additional essentially axis-parallel area 72 and a truncated conically expanding area 74 and an exterior bead rim 76. The exterior bead rim 76 is formed with a conventional shape as shown in FIGS. 1 and 2, and clamped between the coupling rod-side radially exterior supporting ring 22 and collar 24 of joint sleeve 16.

Figure 3:
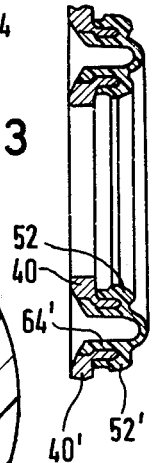
FIG. 3 shows a variant of certain elements in the assembly of FIG. 1.

Alternatively, instead of this radially exterior clamping, a fastening can be provided as shown in FIG. 3, which corresponds to the described radially interior fastening of the sealing cuff 50, and is made up of construction parts which in FIG. 3, are designated by the same reference numerals with prime sign added, as the components described in connection with the radially interior fastening of sealing cuff 50.

I claim:

1. A joint seal on a rotor drive of an eccentric screw machine having a joint sleeve and a coupling rod connected together such as to be movable at an angle with respect to one another and a sealing cuff made of elastomeric or thermoplastic material, said sealing cuff having two radially displaced ends, a radially interior rim bead being formed on one of said ends, a radially exterior rim bead being formed on the other of said ends, said radially interior rim bead being connected to said coupling rod by means of an interior supporting ring, said radially exterior rim bead being connected to said joint sleeve by means of an exterior supporting ring, said radially interior rim bead extending generally axis-parallel with respect to said coupling rod, the sealing cuff additionally having a likewise generally axis-parallel ring apron radially displaced outwardly from its radially interior rim bead, said interior supporting ring having a likewise generally axis-parallel annular limb formed thereon, said annular limb of the interior supporting ring being clasped between said radially interior rim bead and said ring apron of the sealing cuff.

2. The joint seal of claim 1 wherein said radially interior rim bead of the sealing cuff is being held under radial prestress by said axis-parallel annular limb of the interior supporting ring.

3. The joint seal of claim 1 wherein said sealing cuff has an axially exterior side which in operation of said eccentric screw machine is exposed to a medium delivered by the machine when operated as a pump or driving the machine when operated as a motor, said sealing cuff further having an axially interior side remote from said medium, said radial interior rim bead and apron of the sealing cuff which clasp said axis-parallel limb of said interior supporting ring being arranged on the axially interior side of the sealing cuff.

4. The joint seal of claim 3 wherein said radially interior rim bead of the sealing cuff at the axially exterior side thereof has a funnel-shaped bevel whose slope is inclined 10° to 20° with respect to the axis of said coupling rod.

5. The joint seal of claim 4 wherein said radially interior rim bead of the sealing cuff at the axially interior side thereof has a funnel-shaped bevel whose slope is inclined 20° to 40° with respect to the axis of said coupling rod.

6. The joint seal of claim 1 wherein said annular apron engages with a recess in said interior supporting ring.

7. The joint seal of claim 1 wherein said radially interior rim bead and annular apron are vulcanized or cemented onto said interior supporting ring.

8. The joint seal as claimed in any one of claims 1 to 7 wherein said sealing cuff also includes a generally axis-parallel annular apron near its radially exterior rim bead and said seal also includes an exterior supporting ring having a generally axis-parallel annular limb clasped between said radially exterior rim bead and said apron.

9. The joint seal of claim 8 wherein the radially exterior rim bead of the sealing cuff is formed and clamped in a manner similar to that of said radially interior rim bead.

10. A joint seal, as recited in claim 1, wherein said interior supporting ring is clamped between and abuts axially displaced joint members.

* * * * *